United States Patent
Mendonca et al.

(10) Patent No.: US 10,057,772 B2
(45) Date of Patent: Aug. 21, 2018

(54) PROJECTION VIA A DEVICE

(71) Applicant: Microsoft Technology Licensing, LLC, Redmond, WA (US)

(72) Inventors: Rouella J. Mendonca, Seattle, WA (US); Vincent Bellet, Kirkland, WA (US); Cristian M. Matesan, Redmond, WA (US); Phuoc Q. Phan, Seattle, WA (US); Anders E. Klemets, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1 day.

(21) Appl. No.: 15/186,259

(22) Filed: Jun. 17, 2016

(65) Prior Publication Data

US 2017/0289807 A1 Oct. 5, 2017

Related U.S. Application Data

(60) Provisional application No. 62/314,757, filed on Mar. 29, 2016.

(51) Int. Cl.
*H04M 1/68* (2006.01)
*H04W 12/08* (2009.01)
(Continued)

(52) U.S. Cl.
CPC .......... *H04W 12/08* (2013.01); *G06F 3/048* (2013.01); *G06F 3/0481* (2013.01); *G06F 3/0488* (2013.01); *G06F 3/1454* (2013.01); *G06F 21/31* (2013.01); *G06F 21/604* (2013.01); *G06F 21/629* (2013.01); *H04N 7/147* (2013.01); *H04N 7/15* (2013.01);
(Continued)

(58) Field of Classification Search
CPC ....... H04W 12/08; H04W 4/06; G06F 3/1454; G06F 3/0481; H04N 21/4122; H04N 21/41407
USPC .......................................... 455/411; 370/338
See application file for complete search history.

(56) References Cited

U.S. PATENT DOCUMENTS

2010/0306705 A1 12/2010 Nilsson
2012/0284297 A1 11/2012 Aguera-Arcas et al.
(Continued)

FOREIGN PATENT DOCUMENTS

CN 103312820 A 9/2013
CN 104092831 A 10/2014
(Continued)

OTHER PUBLICATIONS

Flanagan, "Pairing devices using QR-Codes", Published on: Apr. 23, 2013 Available at: http://www.qrcode.es/en/pairing-devices-using-qr-codes/.
(Continued)

*Primary Examiner* — Marcos Batista

(57) ABSTRACT

Techniques for projection via a device are described. According to various implementations, techniques described herein enable a locked host device to output data projected from another device while the host device remains in a locked state. In at least some implementations, device context for a host device (locked or unlocked) can be considered in determining whether to broadcast availability to receive projected content.

20 Claims, 9 Drawing Sheets

(51) Int. Cl.

| | |
|---|---|
| *G06F 3/0481* | (2013.01) |
| *G06F 3/14* | (2006.01) |
| *H04N 21/41* | (2011.01) |
| *H04N 21/414* | (2011.01) |
| *H04W 4/06* | (2009.01) |
| *G06F 3/0488* | (2013.01) |
| *G06F 3/048* | (2013.01) |
| *G06F 21/31* | (2013.01) |
| *G06F 21/60* | (2013.01) |
| *G06F 21/62* | (2013.01) |
| *H04N 7/14* | (2006.01) |
| *H04N 7/15* | (2006.01) |
| *H04W 8/00* | (2009.01) |
| *H04W 12/06* | (2009.01) |
| *H04W 88/02* | (2009.01) |

(52) U.S. Cl.
CPC ... *H04N 21/4122* (2013.01); *H04N 21/41407* (2013.01); *H04W 4/06* (2013.01); *H04W 8/005* (2013.01); *H04W 12/06* (2013.01); *H04W 88/02* (2013.01)

(56) References Cited

U.S. PATENT DOCUMENTS

| | | | |
|---|---|---|---|
| 2013/0066908 A1* | 3/2013 | Niranjan | H04W 12/08 707/770 |
| 2013/0124276 A1 | 5/2013 | Brown | |
| 2014/0245173 A1 | 8/2014 | Knodt et al. | |
| 2014/0298190 A1 | 10/2014 | Barrus et al. | |
| 2015/0039440 A1 | 2/2015 | Doumet | |
| 2015/0264720 A1* | 9/2015 | Hino | H04W 76/02 370/315 |
| 2016/0225028 A1* | 8/2016 | Rollert | G06Q 30/0267 |

FOREIGN PATENT DOCUMENTS

| | | |
|---|---|---|
| EP | 1450264 | 8/2004 |
| WO | WO-02102054 | 12/2002 |

OTHER PUBLICATIONS

Francis, William J., "Project your Android phone's screen onto a larger display", Published on: Apr. 18, 2012 Available at: http://www.techrepublic.com/blog/software-engineer/project-your-android-phones-screen-onto-a-larger-display/.

Thurana, Jeffry, "ClearLock—A Cool Transparent Desktop Lock for Windows", Published on: Feb. 16, 2011 Available at: http://www.makeuseof.com/tag/clearlock-cool-transparent-desktop-lock-windows/.

Aditya, et al., "EnCore: Private, Context-based Communication for Mobile Social Apps", In Proceedings of the 12th International Conference on Mobile Systems, Jun. 16, 2014, 14 pages.

"Secure your workstation or server with Password Protection while viewing programs that are running in the background", Published on: Mar. 24, 2015 Available at: http://www.e-motional.com/TScreenLock.htm.

Potoczny-Jones, Isaac, "Quick authentication using mobile devices and QR Codes", Published on: Jan. 5, 2011 Available at: https://galois.com/blog/2011/01/quick-authentication-using-mobile-devices-and-qr-codes/.

Simpkins, Cliff, "Projecting your Windows Phone screen to a PC", Published on: Apr. 18, 2014 Available at: http://www.monkeyslaps.com/projecting-your-windows-phone-screen-to-a-pc/.

"International Search Report and Written Opinion", Application No. PCT/US2017/024205, dated Jun. 16, 2017, 10 pages.

* cited by examiner

PROJECTION VIA A DEVICE

RELATED APPLICATION

This application claims priority under 35 U.S.C. § 119(e) to U.S. Provisional App. No. 62/314,757, filed on Mar. 29, 2016 and titled "Projection via a Device," the entire contents of which are incorporated by reference herein in their entirety.

BACKGROUND

Computing devices today provide users with a wide variety of functionality to perform a diverse array of tasks. For instance, computing devices typically leverage different applications and services (hereinafter "applications") to enable various tasks to be performed, such as productivity tasks, web browsing, content editing, and so forth. Further, users may utilize different devices to perform computing tasks in different environments and scenarios. For instance, an employee with a mobile phone who is visiting a different employee's office may want to share content from the mobile phone to the different employee's desktop computer. Depending on the operating state of the desktop computer, sharing the content from the phone to the desktop computer can present a number of challenges.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for projection via a device are described. According to various implementations, techniques described herein enable a locked host device to output data projected from another device while the host device remains in a locked state. In at least some implementations, device context for a host device (locked or unlocked) can be considered in determining whether to broadcast availability to receive projected content.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
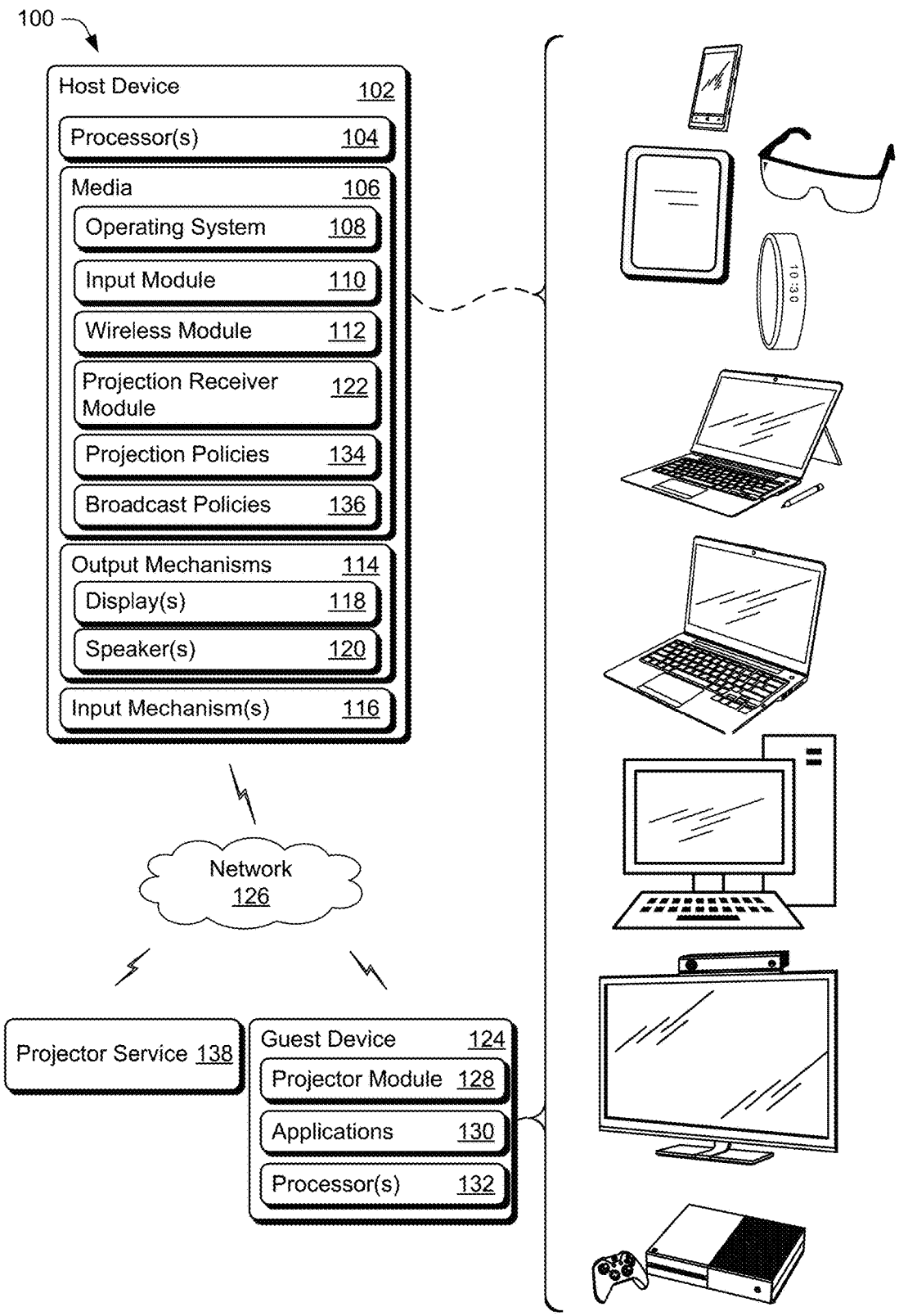
FIG. 1 is an illustration of an environment in an example implementation that is operable to employ techniques discussed herein in accordance with one or more embodiments.

Techniques for projection via a device are described. According to various implementations, techniques described herein enable a locked host device to output data projected from another device (a "guest device") while the host device remains in a locked state. Generally, a locked state refers to a state in which a host device is powered on and booted, but various functionalities of the host device are inaccessible unless the device is unlocked. Thus, techniques for projection via a device enable a locked device to output various types of data projected from a guest device while preventing access to various functionalities of the locked device, such as applications, services, identities, and so forth.

According to various implementations, a host device (locked or unlocked) can determine whether to broadcast its availability to output projected data based on a current device context. For instance, the host device may be in proximity to and/or connected to a particular network. Based on a network type and/or network identity of the particular network, the host device can determine that it is safe or unsafe to broadcast its availability. Consider, for example, that the host device is in proximity and/or connected to a known trusted network, such as a corporate network associated with a user of the host device. In such a scenario, the host device may broadcast its projection availability since the network is trusted and thus the device is less likely to be susceptible to unauthorized and/or malicious access.

Consider, however, another scenario where a host device is in proximity to and/or connected to an unknown and/or untrusted network, such as an open network at a public location. In this scenario, the host device may not broadcast its projection availability since there is a higher likelihood of unwanted and/or malicious access by another device in this particular location, e.g., as compared to a known trusted network.

According to various implementations, a projection connection is established between a host device (e.g., a locked or unlocked host device) and a guest device. For instance, the guest device detects a broadcast from the host device indicating its projection availability, as described above. The guest device queries the host device to establish a projection relationship, and the host device implements a permissions procedure to ascertain whether the guest device is permitted to connect and project to the host device. Accordingly, the guest device and the host device negotiate a connectivity relationship to establish a projection connection between the devices. The guest device then transmits various projection data for output by the host device, such as graphics, video, audio, and so forth. In at least some implementations, the connectivity relationship is established while the host device is in a locked state, and the host device outputs projection data while the host device is in a locked state.

In at least some implementations, the projection data includes a representation of an execution environment generated at the guest device. For instance, various applications and services executing at the guest device generate output data, which is projected from the guest device for output by the host device, e.g., while the host device is in a locked state. Thus, output devices of the host device can be leveraged by the guest device, while other functionalities of the host device (e.g., applications, services, identities, and so forth) are inaccessible to the guest device.

Accordingly, techniques described herein enable a host device (e.g., a locked host device) to output data from a guest device while protecting various resources of the host device from unauthorized and malicious access.

In the following discussion, an example environment is first described that is operable to employ techniques described herein. Next, a section entitled "Example Implementation Scenarios" describes some example implementation scenarios in accordance with one or more embodiments. Following this, a section entitled "Example Procedures" describes some example procedures in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

FIG. 1 illustrates an example environment 100 in which techniques enabling projection via a device can be embodied. Environment 100 includes a host device 102, which may be implemented in various ways. The host device 102, for instance, may be configured as a traditional computer (e.g., a desktop personal computer, laptop computer, and so on), a mobile station, an entertainment appliance, a wireless phone, a tablet, a netbook, a wearable device, and so forth as further described in relation to FIG. 9.

Host device 102 includes computer processor(s) 104 and computer-readable storage media 106 (Media 106). The media 106 includes an operating system 108, an input module 110, and a wireless module 112.

The operating system 108 manages resources of the host device 102 and may be implemented using any suitable instruction format. Generally, the operating system 108 enables functionalities of host device 102 to access hardware and logic resources of host device 102. The wireless module 112 is representative of functionality to enable the host device 102 to communicate (i.e., transmit and receive) data wirelessly.

Host device 102 also includes or has access to output mechanisms 114 and input mechanisms 116. The output mechanisms 114 are representative of functionality to enable the host device 102 to provide various types of output. For instance, the output mechanisms 114 include one or more displays 118 and one or more speakers 120. The displays 118 are generally representative of hardware and logic for visual output, and the speakers 120 are generally representative of hardware and logic for audio output.

The input mechanisms 116 may include a keyboard, a mouse, gesture-sensitive sensors and devices, such as touch-based sensors and movement-tracking sensors (e.g., camera-based), a stylus, touch pads, accelerometers, and microphones with accompanying voice recognition software, and so forth. The input mechanisms 116 may be separate or integral with the display 118, with integral examples including gesture-sensitive displays with integrated touch-sensitive or motion-sensitive sensors. The input module 110 is representative of functionality to enable the host device 102 to receive input (e.g., via the input mechanisms 116) and to process and route the input in various ways.

The media 106 further includes a projection receiver (PR) module 122, which is representative of functionality to enable the host device 102 to output information projected from another device, such as video and/or audio output by the output mechanisms 114. For instance, the host device 102 may connect to a guest device 124 in various ways, such as via a wired and/or wireless connection. The host device 102, for example, can connect to the guest device 124 with a direct wireless connection using any suitable wireless technology, such as Bluetooth, WiFi Direct™, and so forth. Alternatively or additionally, the host device 102 can connect to the guest device 124 over a network 126 and via a wired and/or wireless connection. The network 126 may be implemented in various ways, such as a wired network, a wireless network, and combinations thereof.

The guest device 124 includes a projector module 128, which is representative of functionality to enable the guest device 124 to project output to various other devices. For instance, the projector module 128 of the guest device 124 can interface with the PR module 122 to cause the host device 102 to output information that is generated at the guest device 124, such as graphical user interfaces (GUIs) for applications 130 that reside and/or are executed on the guest device 124, audio output based on audio data generated by the host device 102, and so forth. The output mechanisms 114, for example, can be leveraged to output information (e.g., graphics, video, audio, and so forth) generated by one or more processors 132 of the guest device 124 and transmitted from the guest device 124 to the host device 102. Generally, output information from the processors 132 represents an execution environment of the guest device 124, such as generated based on various applications and services executing on the guest device 124.

As further detailed below, techniques for projection via a device can be employed to enable the guest device 124 to project information for output by the host device 102 even when the host device 102 is locked. Generally, the guest device 124 can be implemented as any suitable device such as a traditional computer (e.g., a desktop personal computer, laptop computer, and so on), a mobile station, an entertainment appliance, a wireless phone, a tablet, a netbook, a wearable device, and so forth as further described in relation to FIG. 9.

The host device 102 further includes projection policies 134 and broadcast policies 136 that reside on the media 106. The projection policies 134 are generally representative of rules and permissions for ascertaining whether a particular device and/or user is permitted to project to the host device 102. In at least some implementations, the projection policies 134 include a allowed list of devices and/or users that are permitted to project to the host device 102, and a blocked list of devices and/or users that are not permitted to project to the host device 102.

The broadcast policies 136 are generally representative of rules and permissions for ascertaining whether the host device 102 can broadcast discoverability information that specifies that the host device 102 is available to project information for a different device, e.g., the guest device 124. In at least some implementations, the broadcast policies 136 are based on different device contexts that can occur. For instance, the broadcast policies 136 may specify network instances/network types in which the host device 102 is permitted to broadcast discoverability information, and other network instances/network types in which the host device 102 is not permitted to broadcast discoverability information.

The applications 130 include any suitable type of application and/or service, such as productivity applications, web browsers, media viewers, navigation applications, multimedia editing applications, and so forth. According to various implementations, the applications 130 may be implemented as locally-installed code that is executed as part of a local runtime environment. Additionally or alternatively, the applications 130 represent portals to distributed functionality, such as web services, cloud services, distributed enterprise services, and so forth. According to various implementations, information generated via execution of the applications 130 by the processors 132 is projected for output by the host device 102.

The environment 100 further includes a projector service 138, which is representative of a service that is accessible to the host device 102 and/or the guest device 124 via the network 126. The projector service 138, for example, represents a network-based service (e.g., a cloud service) that can perform various projection-related tasks for the host device 102 and/or the guest device 124. In at least some implementations, functionalities and tasks described herein with reference to the PR module 122 and/or the projector module 128 can alternatively or additionally be performed by the projector service 138.

Having described an example environment in which implementations for projection via a device may be employed, consider now some example implementation scenarios in accordance with one or more implementations.

Example Implementation Scenarios

This section describes some example implementation scenarios for projection via a device in accordance with one or more implementations. Generally, the implementation scenarios are described as being performed in the environment 100, but may be performed in any suitable environment. Various features introduced with reference to the environment 100 are discussed in the example scenarios but are not explicitly illustrated in the corresponding figures.

Figure 2:
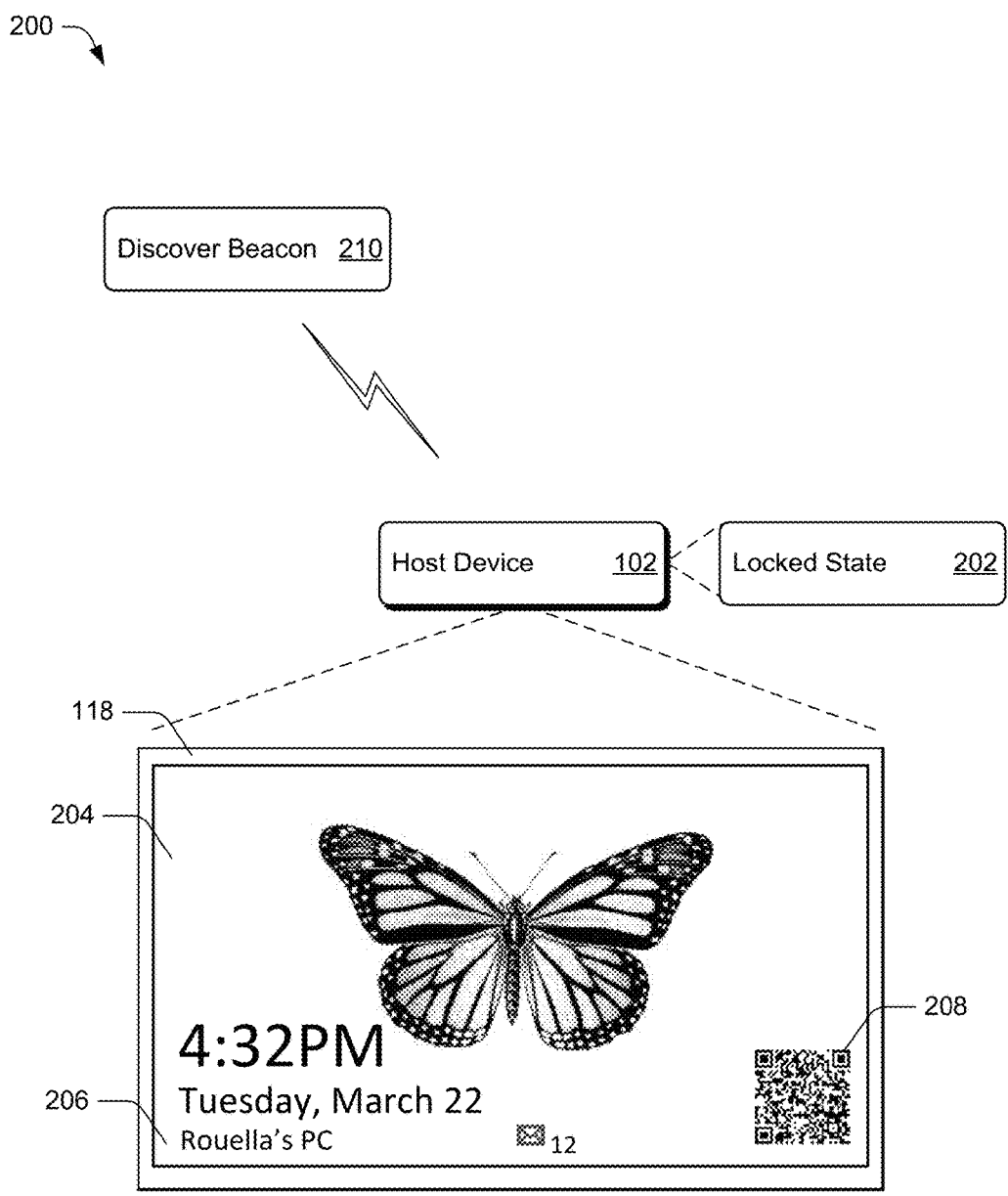
FIG. 2 depicts an example implementation scenario for exposing projection capability in accordance with one or more embodiments.

FIG. 2 depicts an example implementation scenario 200 for exposing projection capability in accordance with one or more implementations. The scenario 200 includes the host device 102 in a locked state 202, as indicated by a lock screen 204 displayed on the display 118. Generally, with the host device 102 in the locked state 202, various functionalities of the host device 102 are prevented from being accessed unless a user unlocks the host device 102. For instance, in the locked state 202, applications, services, and other functionality of the host device 102 are inaccessible via interaction with the host device 102. Generally, a user may unlock the host device 102 by entering valid authentication credentials that cause the host device 102 to transition from the locked state 202 to an unlocked state.

Along with various graphics and textual information, the lock screen 204 displays information that is useful in enabling projection to the host device 102 while in the locked state 202. The PR module 122, for example, generates projection-related information for display on the lock screen 204. For instance, the lock screen 204 includes a device identifier 206 that indicates a custom identifier for the host device 102. In this particular example, the device identifier 206 specifies a particular user associated with the host device 102, i.e., "Rouella's PC."

The lock screen 204 further includes an optical label 208 that is scannable to obtain projection information for projecting to the host device 102. In this particular example the optical label 208 is implemented as a matrix barcode, but in other scenarios may be implemented as any suitable visual indicia in which information for projecting to the host device 102 is embeddable and that is scannable to obtain the information.

The scenario 200 further illustrates that the host device 102 transmits a discover beacon 210 that is detectable by other devices. The discover beacon 210, for instance, represents a wireless signal that includes information about the host device 102 and that indicates that the host device 102 is available to output projected information while the host device 102 is in the locked state 202. In at least some implementations, the PR module 122 communicates information to be included in the discover beacon 210 to the wireless module 112, and the wireless module 112 causes the information to be wirelessly broadcast by the host device 102 as the discover beacon 210. As further detailed below, whether or not the discover beacon 210 is transmitted at a particular moment can depend on a context of the host device 102.

Figure 3:
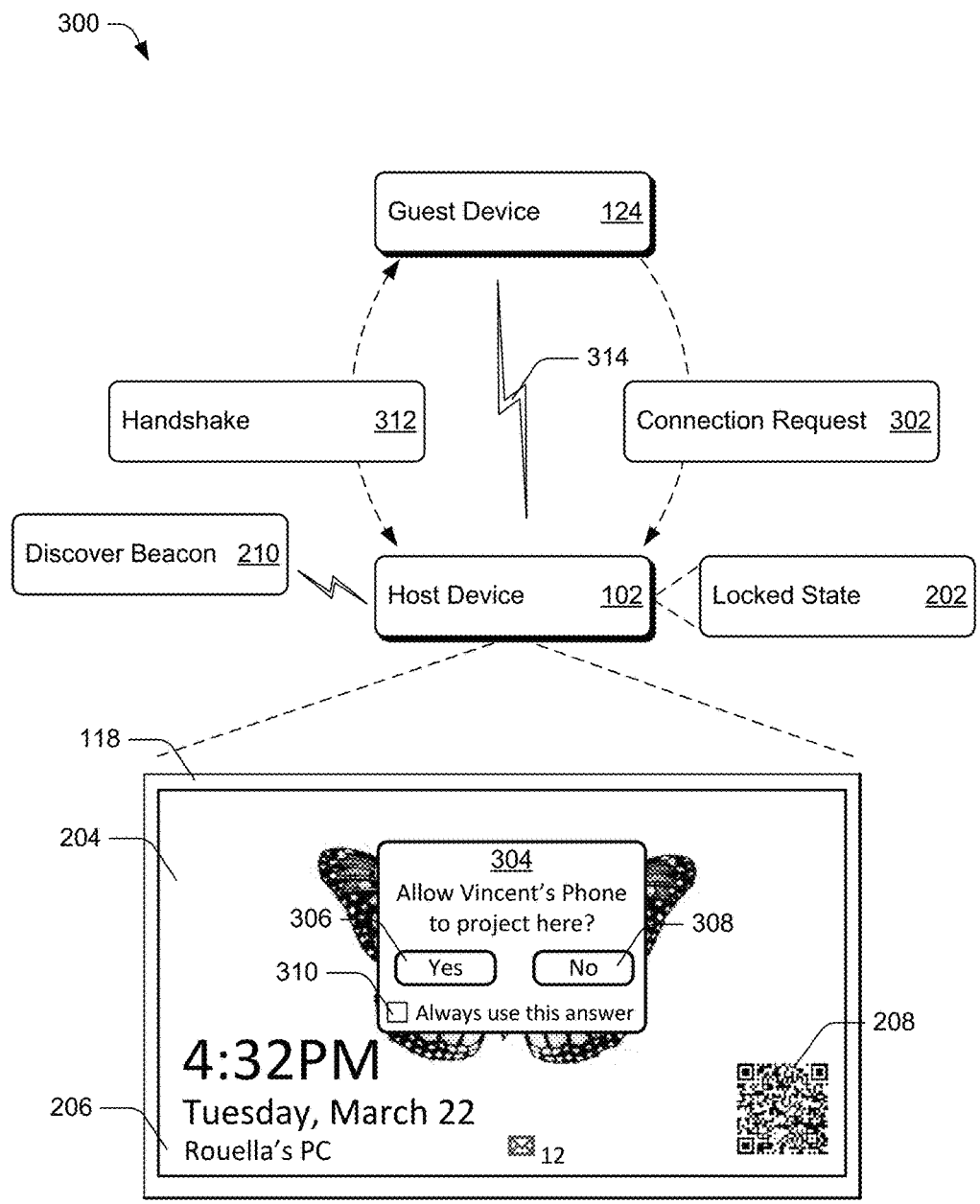
FIG. 3 depicts an example implementation scenario for establishing a projection connection in accordance with one or more embodiments.

FIG. 3 depicts an example implementation scenario 300 for establishing a projection connection in accordance with one or more implementations. The scenario 300, for instance, represents an extension of the scenario 200.

In the scenario 300, the host device 102 is in the locked state 202 with the lock screen 204 displayed on the display 118. Further, the guest device 124 detects that the host device 102 is available to be projected to. For instance, the guest device 124 performs a wireless scan of its local proximity and detects the discover beacon 210 being transmitted by the host device 102. The discover beacon 210 includes identification information for the host device 102, such as the device identifier 206. The discover beacon 210 also includes an indication that the host device 102 is available to receive projection, e.g., while the host device 102 is in the locked state 202.

Alternatively or additionally to detecting the discover beacon 210 and extracting information from the discover beacon 210, the guest device 124 can perform an optical scan of the optical label 208 (e.g., using an onboard camera) to extract information for connecting with and projecting to the host device 102. For instance, identification and connection information for the host device 102 are embedded in the optical label 208, which can be extracted by the guest device 124.

In some environments, the PR module 122 may determine that it is unsafe to broadcast its availability to receive projection, e.g., to broadcast the discover beacon 210. In such environments, the PR module 122 refrains from transmitting the discover beacon 210, but can allow a direct wireless connection to be established via information extracted from the optical label 208 and/or other means.

Continuing with the scenario 300 and using projection information extracted from the discover beacon 210 and/or the optical label 208, the guest device 124 communicates a connection request 302 to the host device 102. Generally, the connection request 302 identifies the guest device 124 and indicates that the guest device 124 is requesting to establish a connection with the host device 102 and to project information to the host device 102.

In response to receiving the connection request 302, the host device 102 performs an authorization procedure to ascertain whether the guest device 124 is permitted to project to the host device 102. For instance, the PR module 122 presents a permission GUI 304 that identifies the guest device 124 and queries as to whether the guest device 124 is permitted to project to the host device 102. The permission GUI 304 further includes an allow control 306 that is selectable to allow the guest device 124 to project to the host device 102, and a deny control 308 that is selectable to disallow the guest device 124 from projecting to the host device 102. Generally, selection of the allow control 306 causes a connection and projection procedure to proceed, and selection of the deny control 308 prevents the guest device 124 from connecting and projecting to the host device 102.

The permission GUI 304 also includes a permission option 310 (e.g., a selectable checkbox) that is selectable to indicate that selection of the allow control 306 or the deny control 308 creates a permissions setting that is to be used automatically for subsequent projection requests from the guest device 124. For instance, if a user selects the permission option 310 and then selects the allow control 306, a subsequent request from the guest device 124 to connect and project to the host device 102 while the computing device is locked will be automatically allowed without presenting the permission GUI 304. The guest device 124, for example, is added to the projection policies 134 as a device that is permitted to project to the host device 102 without requiring user input allowing the guest device 124 to project.

Further, if a user selects the permission option 310 and then selects the deny control 308, a subsequent request from the guest device 124 to connect and project to the host device 102 while the computing device is locked will be automatically denied without presenting the permission GUI 304. The guest device 124, for example, is added to the projection policies 134 as a device that is not permitted to project to the host device 102. In at least some implementations, if the permission option 310 is not selected prior to selection of the allow control 306 or the deny control 308, the permission GUI 304 is presented in response to a subsequent request from the guest device 124 to connect and project to the host device 102.

Proceeding with the scenario 300, consider that a user selects the allow control 306, which causes the PR module 122 to allow a connection and projection procedure between the guest device 124 and the host device 102 to proceed. Accordingly, the guest device 124 and the host device 102 engage in a wireless handshake procedure 312 to establish a projection connection 314 between the devices. The projection connection 314, for instance, can be established as a direct wireless connection between the guest device 124 and the host device 102 using any suitable wireless protocol, such as WiFi Direct™, Bluetooth, and so forth. Alternatively, the projection connection 314 can represent an indirect wireless connection between the guest device 124 and the host device 102, such as via a separate wireless access point over the network 126.

In at least some implementations, the handshake 312 involves an exchange of projection parameters between the host device 102 and the guest device 124. The host device 102, for instance, notifies the guest device 124 of its output capabilities, such as display size and/or resolution of the display 118, audio output capabilities, types of video compression supported by the host device 102, and so forth. Thus, the guest device 124 can configure its projection information based at least in part on projection parameters provided by the host device 102. Once the projection connection 314 is established and the guest device 124 is notified of projection parameters for projecting to the host device 102, the guest device 124 may begin projecting to the host device 102. Consider, for example, the following scenario.

Figure 4:
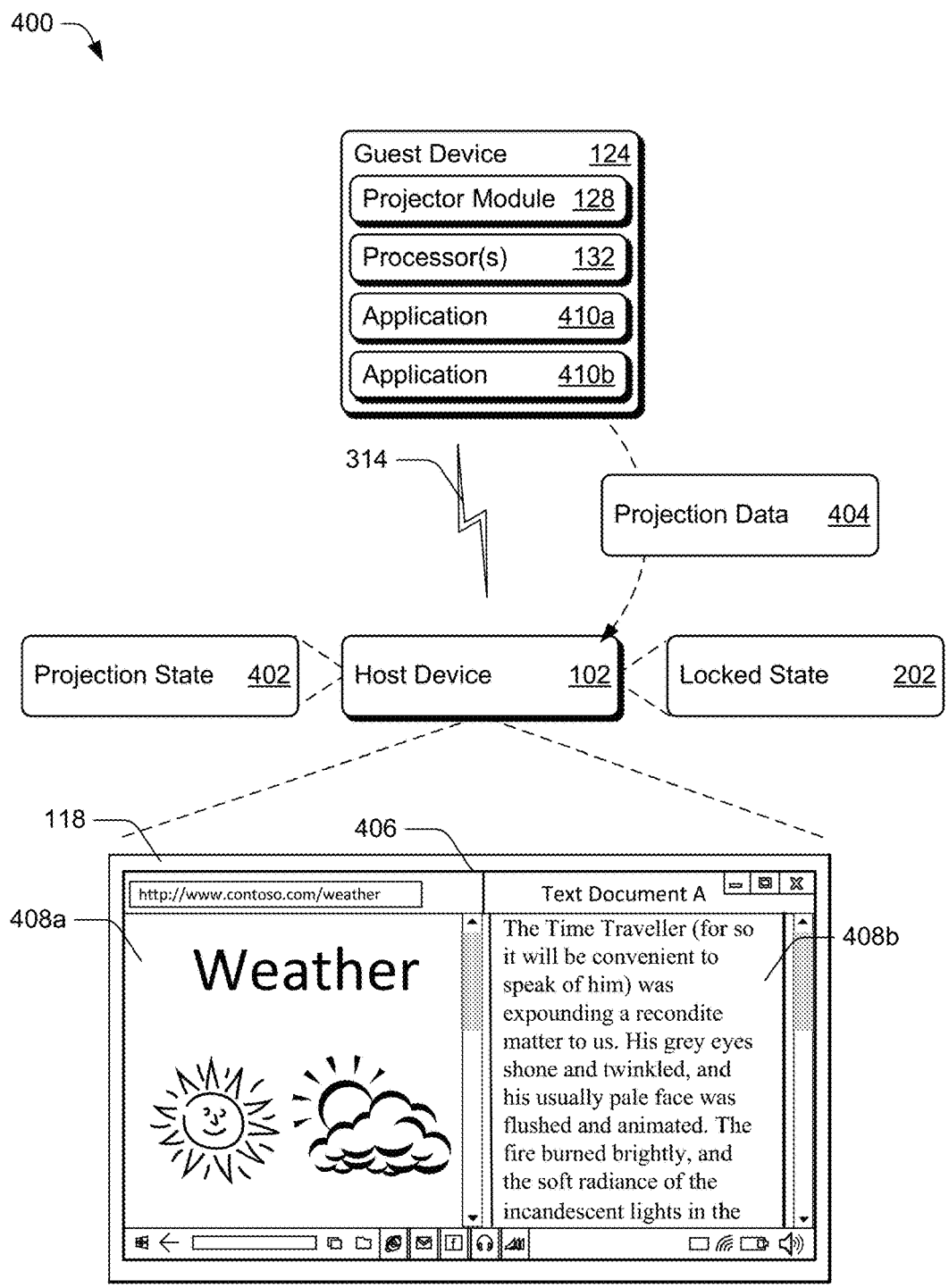
FIG. 4 depicts an example implementation scenario for projection via a device in accordance with one or more embodiments.

FIG. 4 depicts an example implementation scenario 400 for projection via a device in accordance with one or more implementations. The scenario 400, for instance, represents an extension of the scenarios 200, 300 detailed above.

In the scenario 400, the host device 102 is in the locked state 202 and the projection connection 314 has been established, such as described above. Accordingly, the host device 102 transitions to a projection state 402 where the host device 102 remains in the locked state 202, receives projection data 404 from the guest device 124, and outputs the projection data 404.

As part of the projection state 402, a projection canvas 406 is generated by the PR module 122 for output of the projection data 404, and the lock screen 204 is overlaid and/or replaced with the projection canvas 406. Generally, the projection canvas 406 represents a portion of the display 118 on which projection data 404 projected from the guest device 124 is output. In this particular example, the projection canvas 406 displays a GUI 408a for an application 410a executing on the guest device 124, and a GUI 408b for an application 410b executing on the guest device 124. The applications 410a, 410b, for instance, represent instances of the applications 130 introduced above.

In at least some implementations, a user may interact with the GUIs 408a, 408b via input to the guest device 124. Alternatively or additionally, the projection connection 314 enables a user to utilize the input mechanisms 116 of the host device 102 to provide input to the GUIs 408a, 408b. For instance, by allowing the guest device 124 to establish the projection connection 314, the host device 102 may allow the input mechanisms 116 and the output mechanisms to be used as part of a projection relationship between the guest device 124 and the host device 102.

In such implementations, logic of the applications 410a, 410b is executed on the guest device 124 by the processors 132. Further, user input to the GUIs 408a, 408b provided by the input mechanisms 116 can be communicated from the host device 102 to the guest device 124 such that the user input affects execution of the applications 410a, 410b by the processors 132. While the scenario 400 is discussed with reference to visual output to the projection canvas, it is to be appreciated that various other types of output can be provided as part of the projection relationship, such as audio output by the speakers 120, output to peripherals attached to the host device 102 (e.g., to a printer), and so forth.

According to various implementations, the various actions and communications discussed in the scenarios 200-400 occur while the host device 102 is in the locked state 202. For instance, when the guest device 124 and/or the host device 102 terminates the projection connection 314, the host device 102 persists in the locked state 202 and the lock screen 204 is displayed in place of the projection canvas 406.

While the scenarios presented above are described with reference to a host device in a locked state, the scenarios may also be implemented with an unlocked device according to techniques for projection via a device.

Having described some example implementation scenarios, consider now some example procedures for projection via a device in accordance with one or more implementations.

Example Procedures

The following discussion describes some example procedures for projection via a device in accordance with one or more embodiments. The example procedures may be employed in the environment 100 of FIG. 1, the system 900 of FIG. 9, and/or any other suitable environment. The procedures, for instance, represent procedures for implementing the example implementation scenarios discussed above. In at least some embodiments, the steps described for the various procedures can be implemented automatically and independent of user interaction. The procedures are discussed with reference to actions performed by a projection functionality, which represents an entity involved in various aspects of a projection scenario. Examples of a projection functionality include the PR module 122, the projector module 128, the projector service 138, interactions between these modules and/or service, and so forth. This is not intended to be limiting, however, and aspects of the methods may be performed by any suitable entity.

Figure 5:
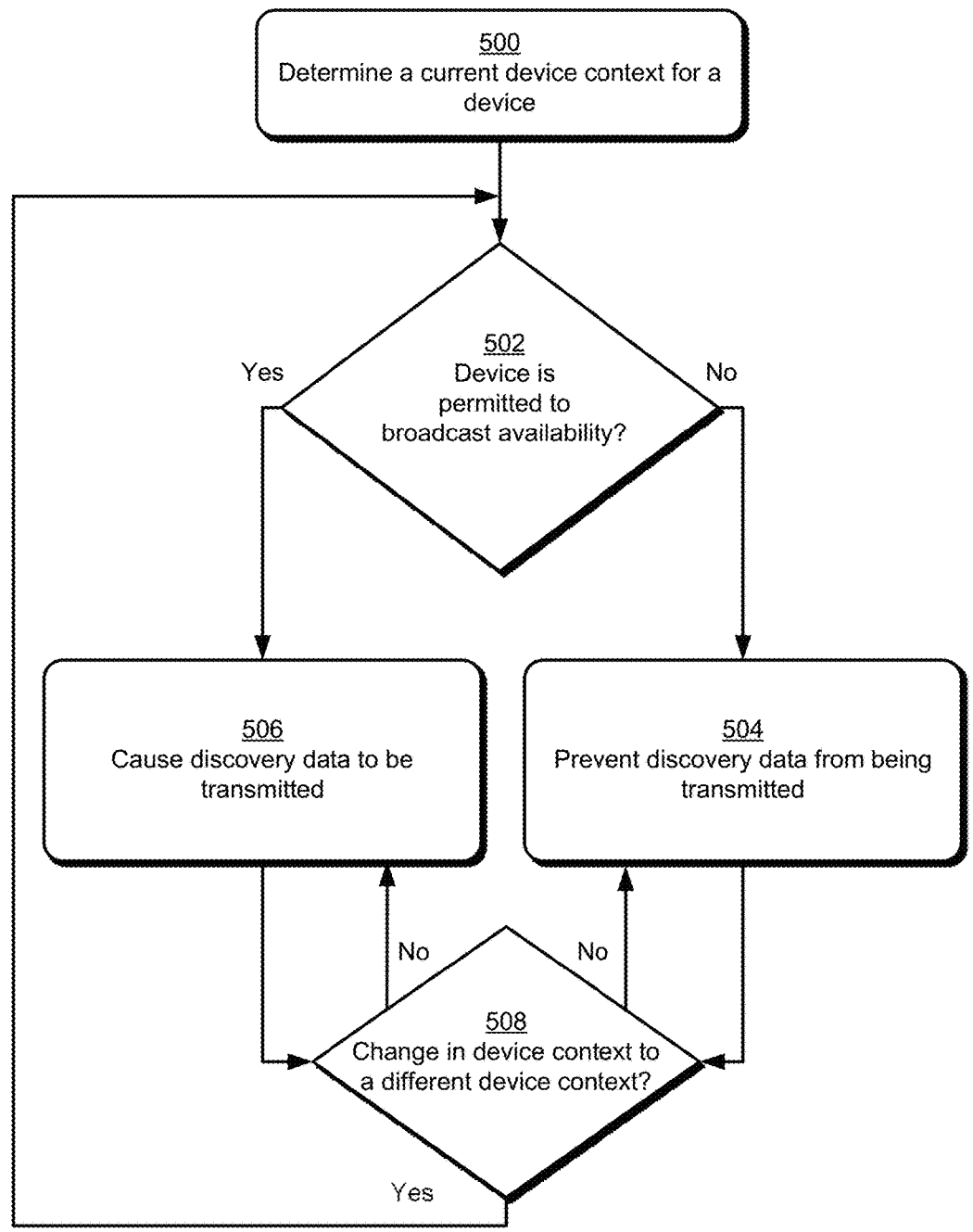
FIG. 5 is a flow diagram that describes steps in an example procedure for ascertaining whether to broadcast availability to receive projected content in accordance with one or more embodiments.

FIG. 5 is a flow diagram that describes steps in a method in accordance with one or more embodiments. The method describes an example procedure for ascertaining whether to broadcast availability to receive projected content in accordance with one or more implementations.

Step 500 determines a current device context for a device. The PR module 122, for instance, determines a current device context of the host device 102. Generally, device context can refer to a variety of different device-related conditions. Examples of device context include an identifier and/or network type for a network to which the device is currently in proximity and/or connected, a geographical location of the device, identities and/or device types for other devices in detectable proximity to the device, and so forth. Generally, step 500 can be performed while a device is in a locked state or an unlocked state.

Step 502 ascertains based on a broadcast policy and a current device context whether the device is permitted to broadcast discovery data indicating its availability to receive projected content from another device. The broadcast policy, for instance, identifies device contexts in which the device is permitted to broadcast its availability, and other device contexts in which the device is not permitted to broadcast its availability. For example, a particular broadcast policy may specify that if a device is connected to a known trusted network (e.g., a corporate network), the device is permitted to broadcast its availability. The broadcast policy may further specify that if the device is connected to an unknown and/or untrusted network (e.g., an open public network), the device is not permitted to broadcast its availability.

If the device is not permitted to broadcast its availability ("No"), step 504 prevents discovery data from being transmitted by the device. The PR module 122, for instance, ascertains that based on the current device context (e.g., current network type), the host device 102 is not permitted to broadcast discovery information. Thus, the PR module 122 does not submit discovery information for transmission by the wireless module 112.

If the device is permitted to broadcast its availability ("Yes"), step 506 causes discovery data that indicates that the device is available to receive projected content to be transmitted. For example, the PR module 122 ascertains that based on the current device context (e.g., current network type), the host device 102 is permitted to broadcast discovery information. Thus, the discovery data is transmitted wirelessly and/or via a wired connection, such as via the discover beacon 210.

Step 508 ascertains whether there is a change in device context to a different device context. The PR module 122, for instance, periodically monitors device context to ascertain whether there is change in context for the host device 102. If there is a change in device context ("Yes"), the procedure returns to step 502 which is performed based on the different device context.

For example, if the host device 102 moves from an allowed network type to a prohibited network type, the PR module 122 may cause the host device 102 to stop broadcasting discovery availability information.

If there is not a change in device context, the procedure returns to the appropriate preceding step, i.e., either step 504 or step 506 depending respectively on whether the device was previously not permitted or permitted to broadcast discoverability information.

According to various implementations, the steps described with reference to FIG. 5 can be performed while a host device is in a locked state or an unlocked state.

Figure 6:
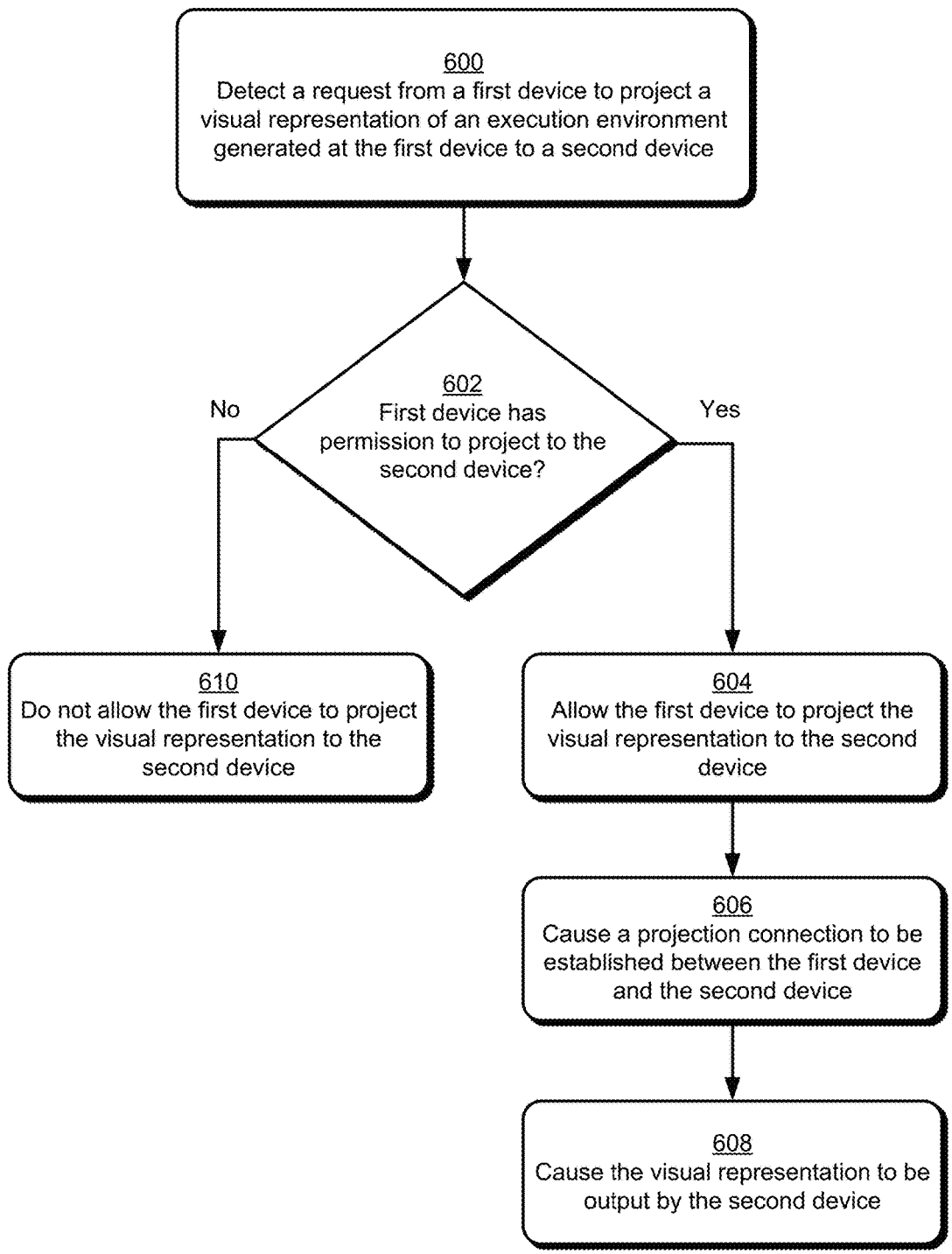
FIG. 6 is a flow diagram that describes steps in an example procedure for ascertaining whether to allow a projection request in accordance with one or more embodiments.

FIG. 6 is a flow diagram that describes steps in a method in accordance with one or more embodiments. The method describes an example procedure for ascertaining whether to allow a projection request in accordance with one or more implementations.

Step 600 detects a request from a first device to project a visual representation of an execution environment generated at the first device to a second device. The host device 102, for example, detects a request from the guest device 124 to establish a connection with the host device 102 while the host device is in a locked state and for purposes of projecting content to the host device 102. The request may take various forms, such as a query that includes information from the discover beacon 210 and/or information extracted from the optical label 208.

Step 602 ascertains whether the first device has permission to project to the second device. The PR module 122, for example, causes a GUI to be presented (e.g., the permission GUI 304) that includes a device identifier and a query as to whether the guest device 124 is to be permitted to project to the host device 102, e.g., while the host device 102 is in a locked state.

Alternatively or additionally, the PR module 122 compares attributes of the guest device 124 to the projection policies 134 to ascertain whether the guest device 124 is permitted to project to the computing device. The projection policies 134, for instance, identify whether certain device instances and/or device types are permitted to project to the host device 102. For example, the projection policies 134 include a first list of device instances and/or device types that are permitted to project to the host device 102 while the host device 102 is in a locked state and/or an unlocked state, and a second list of other device instances and/or device types that are not permitted to project to the host device 102 while the host device 102 a locked state and/or an unlocked state.

If the first device has permission to project to the second device ("Yes"), step 604 allows the first device to project the visual representation to the second device. The PR module 122, for example, receives an indication of user input selecting the allow control 306 indicating permission for the guest device 124 to project to the host device 102. Alternatively or additionally, the PR module 122 determines that the projector device is identified by the projection policies 134 as being permitted to project to the host device 102.

Step 606 causes a projection connection to be established between the first device and the second device. The host device 102, for instance, participates in a handshake procedure that causes a data connection to be established between the host device 102 and the guest device 124. The data connection may be implemented in various ways, such as a direct wireless connection, an indirect wireless connection, a wired connection, and so forth, between the host device 102 and the guest device 124.

Step 608 causes the visual representation to be output by the second device. For example, the host device 102 receives projection data from the guest device 124. The visual representation, for instance, is based on the projection data and represents a visual representation of an execution environment generated at the guest device 124. Various other representations of the execution environment may be output as well, such as audio output, tactile output, output to various peripherals attached to the host device 102, and so forth.

Returning to step 602, if the first device does not have permission to project to the second device ("No"), step 610 does not allow the first device to project the visual representation to the second device. The PR module 122, for example, receives an indication of user input selecting the deny control 308 indicating that the guest device 124 is not permitted to project to the host device 102. Alternatively or additionally, the PR module 122 determines that the projector device is identified by the projection policies 134 as not being permitted to project to the host device 102. In at least some implementations, the host device 102 sends a notification to the guest device 124 indicating that the guest device 124 is denied permission to project to the host device 102.

According to various implementations, the steps and actions described with reference to FIG. 6 can be performed while the second device is in a locked state or an unlocked state.

In at least some implementations, the procedure described with reference to FIG. 5 can run continuously and/or concurrently with the procedure described with reference to FIG. 6 such that changes in device context can cause the host device 102 to change its discoverability and/or projection behaviors.

Figure 7:
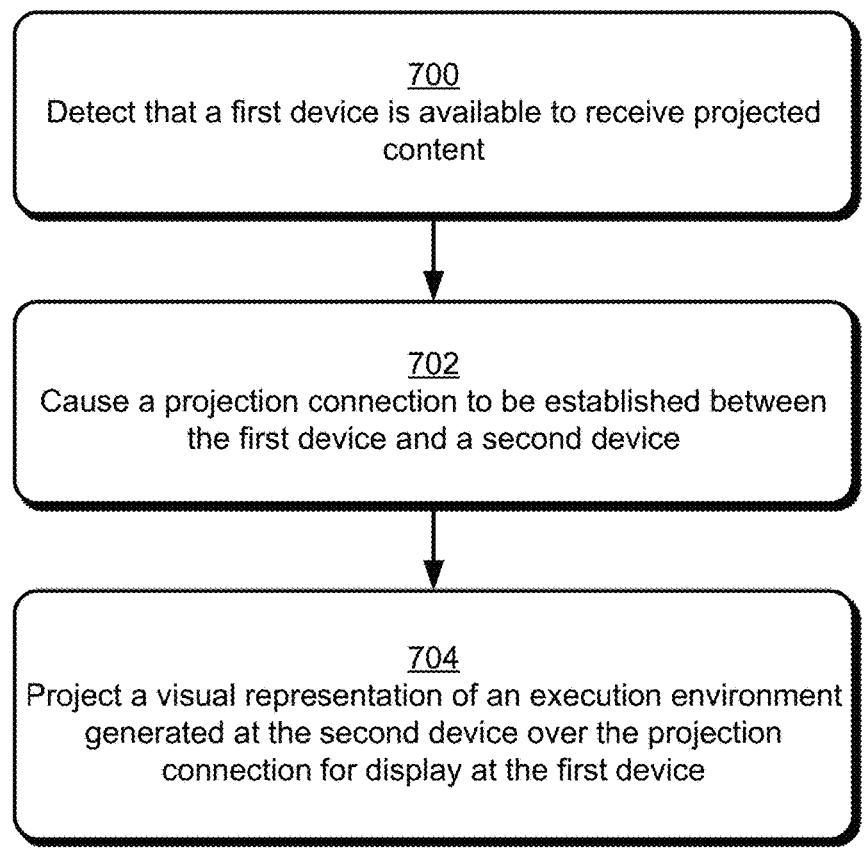
FIG. 7 is a flow diagram that describes steps in an example procedure for causing a projection connection to be established in accordance with one or more embodiments.

FIG. 7 is a flow diagram that describes steps in a method in accordance with one or more embodiments. The method describes an example procedure for causing a projection connection to be established in accordance with one or more implementations.

Step 700 detects that a first device is available to receive projected content. The guest device 124, for instance, detects the discover beacon 210 indicating that the host device 102 is available to receive projected content, such as while the host device 102 is in a locked state. Alternatively or additionally, some other detection technique is employed, such as scanning the optical label 208 to ascertain that the host device 102 is available.

Step 702 causes a projection connection to be established between the first device and a second device. For example, responsive to the host device 102 granting permission to the guest device 124 to project to the host device 102, the guest device 124 and the host device 102 perform a procedure to establish a connection between the devices, e.g., a direct wireless connection.

Establishing the projection connection may also involve an exchange of projection parameters between the host device 102 and the guest device 124. The guest device 124, for example, receives various parameters from the host device 102 to be used by the guest device 124 in configuring projection data for transmission to the host device 102. Examples of such parameters include video and/or audio compression/encoding supported by the host device 102, display size/resolution of the host device 102, processing capabilities (e.g., bandwidth) of the host device 102, and so forth.

Step 704 projects a visual representation of an execution environment generated at the second device over the projection connection for display at the first device. The guest device 124, for example, executes various tasks locally, such as the applications 130, to generate projection data describing output from the tasks, such as graphics, audio, and so forth. The guest device 124 then transmits the projection data to the host device 102 for output by the host device 102, such as while the host device 102 is in a locked state. In at least some implementations, the host device 102 replaces and/or overlays a lock screen with the visual representation of the execution environment.

According to various implementations, the steps and actions described with reference to FIG. 7 can be performed while the first device is in a locked state or an unlocked state.

Figure 8:
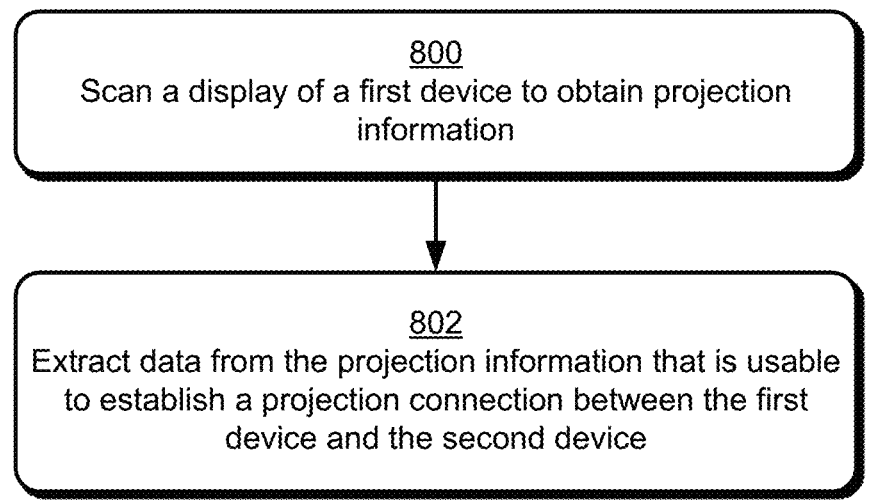
FIG. 8 is a flow diagram that describes steps in an example procedure for obtaining scannable projection information in accordance with one or more embodiments.

FIG. 8 is a flow diagram that describes steps in a method in accordance with one or more embodiments. The method describes an example procedure for obtaining scannable projection information in accordance with one or more implementations.

Step 800 scans a display of a first device to obtain projection information. The guest device 124, for instance, scans the optical label 208 and/or other visual indicia displayed on the display 118 of the host device 102.

Step 802 extracts data from the projection information that is usable to establish a projection connection between the first device and the second device. For example, the projector module 128 of the guest device 124 processes the projection information to identify various parameters for connection and projection to the host device 102. Examples of such connection and projection information are described throughout this document.

According to various implementations, the steps and actions described with reference to FIG. 8 can be performed while the first device is in a locked state or an unlocked state.

Accordingly, techniques for projection via a device described herein enable host devices to output projected data from other devices while maintaining security of the host devices.

Having discussed some example procedures, consider now a discussion of an example system and device in accordance with one or more embodiments.

Example System and Device

Figure 9:
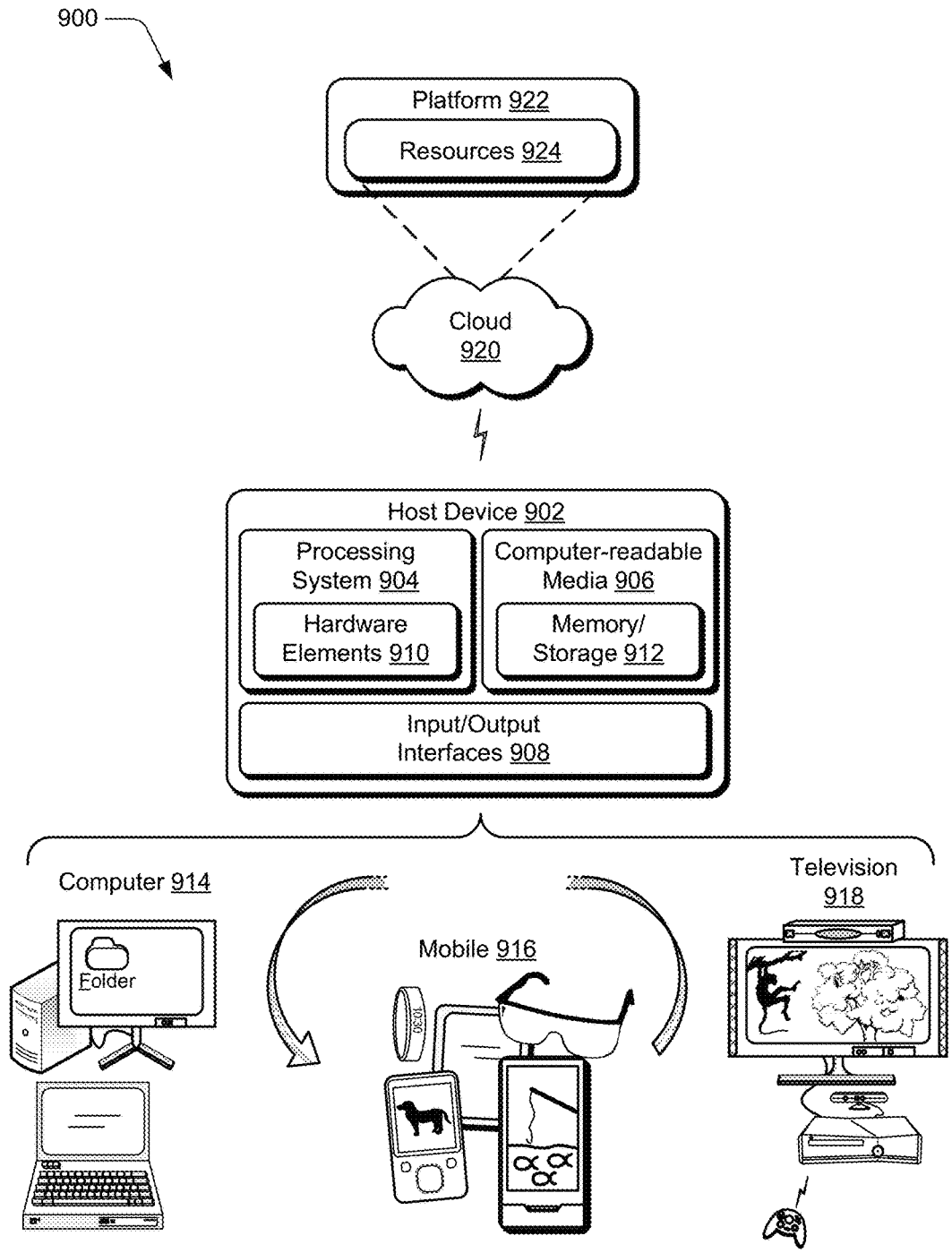
FIG. 9 illustrates an example system and computing device as described with reference to FIG. 1, which are configured to implement embodiments of techniques described herein.

FIG. 9 illustrates an example system generally at 900 that includes an example computing device 902 that is representative of one or more computing systems and/or devices that may implement various techniques described herein. For example, the host device 102 and/or the guest device 124 discussed above with reference to FIG. 1 can be embodied as the computing device 902.

The computing device 902 may be, for example, a server of a service provider, a device associated with the client (e.g., a client device), an on-chip system, and/or any other suitable computing device or computing system.

The example computing device 902 as illustrated includes a processing system 904, one or more computer-readable media 906, and one or more Input/Output (I/O) Interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 is illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 910 and computer-readable media 906 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of modules that are executable by the computing device 902 as software may be achieved at least partially in hardware, e.g., through use of computer-readable storage media and/or hardware elements 910 of the processing system. The instructions and/or functions may be executable/operable by one or more articles of manufacture (for example, one or more computing devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 902 may assume a variety of different configurations, such as for computer 914, mobile 916, and television 918 uses. Each of these configurations includes devices that may have generally different constructs and capabilities, and thus the computing device 902 may be configured according to one or more of the different device classes. For instance, the computing device 902 may be implemented as the computer 914 class of a device that includes a personal computer, desktop computer, a multi-screen computer, laptop computer, netbook, and so on.

The computing device 902 may also be implemented as the mobile 916 class of device that includes mobile devices, such as a mobile phone, portable music player, portable gaming device, a tablet computer, a wearable device, a multi-screen computer, and so on. The computing device 902 may also be implemented as the television 918 class of device that includes devices having or connected to generally larger screens in casual viewing environments. These devices include televisions, set-top boxes, gaming consoles, and so on.

The techniques described herein may be supported by these various configurations of the computing device 902 and are not limited to the specific examples of the techniques described herein. For example, functionalities discussed with reference to the host device 102 and/or the guest device 124 may be implemented all or in part through use of a distributed system, such as over a "cloud" 920 via a platform 922 as described below.

The cloud 920 includes and/or is representative of a platform 922 for resources 924. The platform 922 abstracts underlying functionality of hardware (e.g., servers) and software resources of the cloud 920. The resources 924 may include applications and/or data that can be utilized while computer processing is executed on servers that are remote from the computing device 902. Resources 924 can also include services provided over the Internet and/or through a subscriber network, such as a cellular or Wi-Fi network.

The platform 922 may abstract resources and functions to connect the computing device 902 with other computing devices. The platform 922 may also serve to abstract scaling of resources to provide a corresponding level of scale to encountered demand for the resources 924 that are implemented via the platform 922. Accordingly, in an interconnected device embodiment, implementation of functionality described herein may be distributed throughout the system 900. For example, the functionality may be implemented in part on the computing device 902 as well as via the platform 922 that abstracts the functionality of the cloud 920.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100 and/or the system 900.

Implementations discussed herein include:

Example 1

A system for ascertaining whether to allow a second device to project a visual representation of an execution environment to a first device, the system including: one or more processors; and one or more computer-readable media storing processor-executable instructions that, responsive to execution by the one or more processors, cause the system to perform operations including: determining based on a broadcast policy and a current device context that a first device is permitted to broadcast it's availability to receive projected content from another device; causing discovery data that indicates that the first device is available to receive projected content to be transmitted wirelessly; detecting a request from a second device to project a visual representation of an execution environment generated at the second device to the first device; ascertaining whether the second device has permission to project to the first device; and allowing or denying the second device to project the visual representation to the first device based on whether the second device is indicated as having permission to project to the first device.

Example 2

A system as described in example 1, wherein the system is configured to perform the operations while the first device is in a locked state.

Example 3

A system as described in one or more of examples 1 or 2, wherein the broadcast policy specifies a first device context in which the first device is permitted to broadcast its availability to receive projected content, and a second device context in which the first device is not permitted to broadcast its availability to receive project content, and wherein the current device context corresponds to the first device context.

Example 4

A system as described in one or more of examples 1-3, wherein the broadcast policy specifies a first network type in which the first device is permitted to broadcast its availability to receive projected content, and a second network type in which the first device is not permitted to broadcast its availability to receive project content, and wherein the current device context indicates that the first device is connected to a network of the first network type.

Example 5

A system as described in one or more of examples 1-4, wherein the request from the second device includes a device identifier for the second device, and wherein the operations further include causing a graphical user interface (GUI) to be presented that includes the device identifier and a query as to whether the second device is to be permitted to project to the first device while the first device is in a locked state.

Example 6

A system as described in one or more of examples 1-5, wherein said ascertaining is based on a projection policy that applies to the second device, and wherein said allowing or denying is performed based on whether the projection policy indicates that the second device is permitted to project to the first device while the first device is in a locked state.

Example 7

A system as described in one or more of examples 1-6, wherein said ascertaining is based on a projection policy that includes: a first list of one or more devices that are permitted to project to the first device while the first device is in a locked state; and a second list of one or more devices that are not permitted to project to the first device while the first device is in a locked state, wherein said allowing or denying is performed based on whether the second device is listed in the first list or the second list.

Example 8

A system as described in one or more of examples 1-7, wherein the operations further include displaying projection information that is scannable by the second device to extract information that is usable to establish a projection connection between the first device and the second device.

Example 9

A system as described in one or more of examples 1-8, wherein the operations further include: detecting a change from the current device context to a different device context; determining based on the projection policy and the different device context that the first device is not permitted to broadcast it's availability to receive projected content from another device; and preventing the discovery data from being transmitted while the different device context applies.

Example 10

A system as described in one or more of examples 1-9, wherein the operations further include: allowing the second device permission to project the visual representation to the first device based on the second device being indicated as having permission to project to the first device while the first device is in a locked state; and causing the visual representation to be displayed by the first device while the first device is in the locked state.

Example 11

A method for ascertaining whether to allow a first device to project a visual representation of an execution environment to a second device, the method including: detecting a request from a first device to project a visual representation of an execution environment generated at the first device to a second device while the second device is in a locked state; ascertaining whether the first device has permission to project to the second device while the second device is in the locked state; and allowing or denying the first device permission to project the visual representation to the second device based on whether the first device is indicated as having permission to project to the second device while the second device is in the locked state.

Example 12

A method as described in example 11, further including: displaying projection information that is scannable to extract information that is usable to establish a projection connection with the second device; and allowing the first device permission to project the visual representation to the second device based on the first device being indicated as having permission to project to the second device while the second device is in the locked state; and establishing a projection connection between the first device and the second device based at least in part in the information included in the displayed projection information.

Example 13

A method as described in one or more of examples 11 or 12, further including: determining based on a broadcast policy and a current device context that the second device is permitted to broadcast it's availability to receive projected content from another device; causing discovery data that indicates that the second device is available to receive projected content to be transmitted wirelessly and while the second device is in a locked state, wherein the request from the first device is based at least in part on the discovery data.

Example 14

A method as described in one or more of examples 11-13, further including: determining based on a broadcast policy and a current device context that the second device is not permitted to broadcast it's availability to receive projected content from another device; and preventing discovery data that indicates that the second device is available to receive projected content from being transmitted while the second device is in a locked state and while the current device context applies.

Example 15

A method as described in one or more of examples 11-14, further including: determining based on a network type of a network to which the second device is connected whether the second device is permitted to broadcast it's availability to receive projected content from another device; and allowing or preventing transmission of discovery data that indicates that the second device is available to receive projected content while the second device is in a locked state based on the network type of the network.

Example 16

A method as described in one or more of examples 11-15, wherein said ascertaining is based on a projection policy that includes: a first list of one or more devices that are permitted to project to the second device while the second device is in the locked state; and a second list of one or more devices that are not permitted to project to the second device while the second device is in the locked state, wherein said allowing or denying is performed based on whether the first device is listed in the first list or the second list.

Example 17

A method for projecting a visual representation of an execution environment to a locked device, the method including: detecting that a first device is available to receive projected content while the first device is in a locked state; causing a projection connection to be established between the first device and a second device and while the first device is in the locked state; and projecting a visual representation of an execution environment generated at the second device over the projection connection for display at the first device while the first device is in the locked state.

Example 18

A method as described in example 17, wherein said detecting includes detecting wireless discovery data that indicates that the first device is available to receive projected content while the first device is in a locked state.

Example 19

A method as described in one or more of examples 17 or 18, wherein said detecting includes: scanning a display of the first device to obtain projection information that is displayed on the display; and extracting data from the projection information that is usable to establish a projection connection between the first device and the second device.

Example 20

A method as described in one or more of examples 17-19, wherein the visual representation of the execution environment includes a graphical user interface (GUI) generated by an application executing on the second device, and wherein said projecting causes the GUI to be displayed overlaying a lock screen of the first device.

Conclusion

Although embodiments of techniques and apparatuses enabling projection via a device have been described in language specific to features and/or methods, it is to be understood that the subject of the appended claims is not necessarily limited to the specific features or methods described. Rather, the specific features and methods are disclosed as example implementations enabling projection via a device.

What is claimed is:
1. A system comprising:
one or more processors; and
one or more computer-readable media storing processor-executable instructions that, responsive to execution by the one or more processors, cause the system to perform operations including:
determining based on a broadcast policy and a current device context that a first device is permitted to broadcast it's availability to receive projected content from another device;
causing discovery data that indicates that the first device is available to receive projected content to be transmitted wirelessly;
detecting a request from a second device to project a visual representation of an execution environment generated at the second device to the first device;
ascertaining whether the second device has permission to project to the first device; and
allowing or denying the second device to project the visual representation to the first device based on whether the second device is indicated as having permission to project to the first device.

2. The system as described in claim 1, wherein the system is configured to perform the operations while the first device is in a locked state.

3. The system as described in claim 1, wherein the broadcast policy specifies a first device context in which the first device is permitted to broadcast its availability to receive projected content, and a second device context in which the first device is not permitted to broadcast its availability to receive project content, and wherein the current device context corresponds to the first device context.

4. The system as described in claim 1, wherein the broadcast policy specifies a first network type in which the first device is permitted to broadcast its availability to receive projected content, and a second network type in which the first device is not permitted to broadcast its availability to receive project content, and wherein the current device context indicates that the first device is connected to a network of the first network type.

5. The system as described in claim 1, wherein the request from the second device includes a device identifier for the second device, and wherein the operations further include causing a graphical user interface (GUI) to be presented that includes the device identifier and a query as to whether the second device is to be permitted to project to the first device while the first device is in a locked state.

6. The system as described in claim 1, wherein said ascertaining is based on a projection policy that applies to the second device, and wherein said allowing or denying is performed based on whether the projection policy indicates that the second device is permitted to project to the first device while the first device is in a locked state.

7. The system as described in claim 1, wherein said ascertaining is based on a projection policy that includes:
a first list of one or more devices that are permitted to project to the first device while the first device is in a locked state; and
a second list of one or more devices that are not permitted to project to the first device while the first device is in a locked state,
wherein said allowing or denying is performed based on whether the second device is listed in the first list or the second list.

8. The system as described in claim 1, wherein the operations further include displaying projection information that is scannable by the second device to extract information that is usable to establish a projection connection between the first device and the second device.

9. The system as described in claim 1, wherein the operations further include:
    detecting a change from the current device context to a different device context;
    determining based on the projection policy and the different device context that the first device is not permitted to broadcast it's availability to receive projected content from another device; and
    preventing the discovery data from being transmitted while the different device context applies.

10. The system as described in claim 1, wherein the operations further include:
    allowing the second device permission to project the visual representation to the first device based on the second device being indicated as having permission to project to the first device while the first device is in a locked state; and
    causing the visual representation to be displayed by the first device while the first device is in the locked state.

11. A method comprising:
    detecting a request from a first device to project a visual representation of an execution environment generated at the first device to a second device while the second device is in a locked state;
    ascertaining whether the first device has permission to project to the second device while the second device is in the locked state;
    allowing or denying the first device permission to project the visual representation to the second device based on whether the first device is indicated as having permission to project to the second device while the second device is in the locked state; and
    causing, in an event that the first device is permitted to project the visual representation to the second device, the visual representation to be communicated to the second device such that the visual representation is displayable on the second device while the second device is in the locked state.

12. A method as recited in claim 11, further comprising:
    displaying projection information that is scannable to extract information that is usable to establish a projection connection with the second device;
    allowing the first device permission to project the visual representation to the second device based on the first device being indicated as having permission to project to the second device while the second device is in the locked state; and
    establishing a projection connection between the first device and the second device based at least in part in the information included in the displayed projection information.

13. A method as recited in claim 11, further comprising:
    determining based on a broadcast policy and a current device context that the second device is permitted to broadcast it's availability to receive projected content from another device;
    causing discovery data that indicates that the second device is available to receive projected content to be transmitted wirelessly and while the second device is in a locked state,
    wherein the request from the first device is based at least in part on the discovery data.

14. A method as recited in claim 11, further comprising:
    determining based on a broadcast policy and a current device context that the second device is not permitted to broadcast it's availability to receive projected content from another device; and
    preventing discovery data that indicates that the second device is available to receive projected content from being transmitted while the second device is in a locked state and while the current device context applies.

15. A method as recited in claim 11, further comprising:
    determining based on a network type of a network to which the second device is connected whether the second device is permitted to broadcast it's availability to receive projected content from another device; and
    allowing or preventing transmission of discovery data that indicates that the second device is available to receive projected content while the second device is in a locked state based on the network type of the network.

16. A method as recited in claim 11, wherein said ascertaining is based on a projection policy that includes:
    a first list of one or more devices that are permitted to project to the second device while the second device is in the locked state; and
    a second list of one or more devices that are not permitted to project to the second device while the second device is in the locked state,
    wherein said allowing or denying is performed based on whether the first device is listed in the first list or the second list.

17. A method comprising:
    detecting that a first device is available to receive projected content while the first device is in a locked state, including detecting discovery data transmitted from the first device that indicates that the first device is available to receive projected content while the first device is in a locked state;
    causing a projection connection to be established between the first device and a second device and while the first device is in the locked state; and
    projecting a visual representation of an execution environment generated at the second device over the projection connection for display at the first device while the first device is in the locked state.

18. A method as recited in claim 17, wherein said detecting further comprises:
    scanning a display of the first device to obtain projection information that is displayed on the display; and
    extracting data from the projection information that is usable to establish a projection connection between the first device and the second device.

19. A method as recited in claim 17, wherein the visual representation of the execution environment includes a graphical user interface (GUI) generated by an application executing on the second device, and wherein said projecting causes the GUI to be displayed overlaying a lock screen of the first device.

20. A method as recited in claim 17, wherein said causing the projection connection to be established comprises causing one or more projection parameters to be received at the second device, the projection parameters being configured to be applied to the visual representation of the execution environment prior to being communicated to the first device.

* * * * *